United States Patent
Baltes et al.

(10) Patent No.: US 9,021,246 B2
(45) Date of Patent: Apr. 28, 2015

(54) METHOD TO REPLACE BOOTLOADER PUBLIC KEY

(75) Inventors: Kevin M. Baltes, Wixom, MI (US); Thomas M. Forest, Macomb, MI (US); Mark H. Costin, Bloomfield Township, MI (US); Ansaf I. Alrabady, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 68 days.

(21) Appl. No.: 13/557,046

(22) Filed: Jul. 24, 2012

(65) Prior Publication Data

US 2013/0111203 A1    May 2, 2013

Related U.S. Application Data

(60) Provisional application No. 61/552,962, filed on Oct. 28, 2011.

(51) Int. Cl.
*G06F 9/00* (2006.01)
*G06F 9/24* (2006.01)
*H04L 9/32* (2006.01)
*G06F 21/57* (2013.01)
*H04L 9/08* (2006.01)

(52) U.S. Cl.
CPC . *G06F 21/57* (2013.01); *H04L 9/08* (2013.01)

(58) Field of Classification Search
CPC ........ G06F 9/445; G06F 21/57; G06F 21/572
USPC ................ 713/2, 100, 165, 189, 193, 1, 176; 380/273, 277, 285, 281
See application file for complete search history.

(56) References Cited

U.S. PATENT DOCUMENTS

| | | | |
|---|---|---|---|
| 8,560,823 B1 * | 10/2013 | Aytek et al. | 713/2 |
| 2003/0140238 A1 * | 7/2003 | Turkboylari | 713/193 |
| 2004/0083375 A1 * | 4/2004 | Foster et al. | 713/189 |
| 2004/0218763 A1 * | 11/2004 | Rose et al. | 380/277 |
| 2006/0236111 A1 * | 10/2006 | Bodensjo et al. | 713/176 |
| 2007/0005948 A1 * | 1/2007 | Kuhls et al. | 713/1 |
| 2007/0055881 A1 * | 3/2007 | Fuchs et al. | 713/175 |
| 2008/0232595 A1 * | 9/2008 | Pietrowicz et al. | 380/277 |
| 2009/0138720 A1 * | 5/2009 | Jeong et al. | 713/176 |
| 2009/0323967 A1 * | 12/2009 | Peirce et al. | 380/278 |
| 2010/0040234 A1 * | 2/2010 | Alrabady et al. | 380/278 |
| 2010/0100721 A1 * | 4/2010 | Su et al. | 713/150 |
| 2010/0202618 A1 * | 8/2010 | Yang et al. | 380/277 |
| 2011/0040960 A1 * | 2/2011 | Deierling et al. | 713/2 |
| 2011/0191595 A1 * | 8/2011 | Damian et al. | 713/189 |
| 2012/0240107 A1 * | 9/2012 | Brescia | 717/168 |
| 2013/0031541 A1 * | 1/2013 | Wilks et al. | 717/176 |

* cited by examiner

*Primary Examiner* — Shewaye Gelagay
*Assistant Examiner* — Shanto M Abedin
(74) *Attorney, Agent, or Firm* — John A. Miller; Miller IP Group, PLC

(57) ABSTRACT

A system and method for writing a new or replacement public key to a bootloader stored in a memory segment in the memory of a vehicle ECU without having to rewrite the entire bootloader. The method includes defining a key table in the bootloader memory segment includes a number of vacant memory slots that are available to store replacement public keys if they are needed. The key table is a separate section of the bootloader memory segment so that the key table memory slots are not used by the bootloader code.

18 Claims, 5 Drawing Sheets

METHOD TO REPLACE BOOTLOADER PUBLIC KEY

CROSS-REFERENCE TO RELATED APPLICATIONS

This application claims the benefit of the priority date of U.S. Provisional Patent Application Ser. No. 61/552,962, titled, Method to Replace Bootloader Public Key, filed Oct. 28, 2011.

BACKGROUND OF THE INVENTION

1. Field of the Invention

This invention relates generally to a system and method for replacing the public key that is part of a bootloader stored in a controller and, more particularly, to a system and method for replacing the public key that is part of a bootloader stored in a vehicle electronic control unit (ECU), where the method includes defining a key table that includes memory slots that are part of the bootloader memory flash segment, but are available to separately store replacement public keys.

2. Discussion of the Related Art

Most modern vehicles include electronic control units (ECUs), or controllers, that control the operation of vehicle systems, such as the powertrain, climate control system, infotainment system, body systems, chassis systems, and others. Such controllers require special purpose-designed software in order to perform the control functions. With the increasing number and complexity of these controllers, and the growing threat posed by developers of malicious software, it is more important than ever to authenticate the source and content of binary files that are loaded on automotive controllers. The consequences of using software that is not properly validated, or worse, maliciously-designed, in a vehicle controller include unintended behavior of the vehicle or its systems, loss of anti-theft features on the vehicle, potential tampering with components such as the odometer, and loss of other vehicle features and functions.

One known digital coding technique is referred to as asymmetric key cryptography that uses digital signatures for authenticating files that are programmed into controllers. As would be well understood by those skilled in the art, asymmetric key cryptography uses a pair of mathematically-related keys, known as a private key and a public key, to encrypt and decrypt a message. To create a digital signature, a signer uses his private key, which is known only to himself, to encrypt a message. The digital signature can later be decrypted by another party using the public key, which is paired to the signer's private key.

Flashing is a well known process for uploading software, calibration files and other applications into the memory of a vehicle ECU or other programmable device. A bootloader is an embedded software program loaded on the ECU that provides an interface between the ECU and a programming device that is flashing the software. The bootloader typically employs asymmetric key cryptography and stores a public key that must be used to decode the digital signature transferred by the programming device before allowing the ECU to execute the software or calibration.

If the public key in the bootloader is compromised or needs to be replaced for other reasons, it is desirable to provide a secure method by the appropriate service personnel to allow the key to be replaced. The bootloader generally uses only one flash segment of memory, which includes the public key, so the public key cannot be made a separately programmable calibration. Thus, if the public key needs to be replaced, the entire bootloader needs to be rewritten and replaced, which is undesirable as an interrupted operation could lead to an ECU that can no longer be programmed.

SUMMARY OF THE INVENTION

In accordance with the teachings of the present invention, a system and method are disclosed for writing a new or replacement public key to a bootloader stored in a memory segment in the memory of a vehicle ECU without having to rewrite the entire bootloader. The method includes defining a key table in the bootloader memory segment that includes a number of vacant memory slots that are available to store replacement public keys if they are needed. Each memory slot in the key table includes a validity flag indicating whether the memory slot is loaded with a valid public key, where the bootloader uses the last slot in the key table having a valid public key. The key table is a separately reserved section of the bootloader memory segment so that the key table memory slots are not normally used by the bootloader code.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for replacing a public key in a bootloader stored in a vehicle ECU memory is merely exemplary in nature, and is in no way intended to limit the invention or its applications or uses. For example, as discussed herein, the technique for replacing the public key in the bootloader is for a vehicle ECU. However, as will be appreciated by those skilled in the art, the method for replacing a public key in a bootloader may have application for other controllers.

Figure 1:
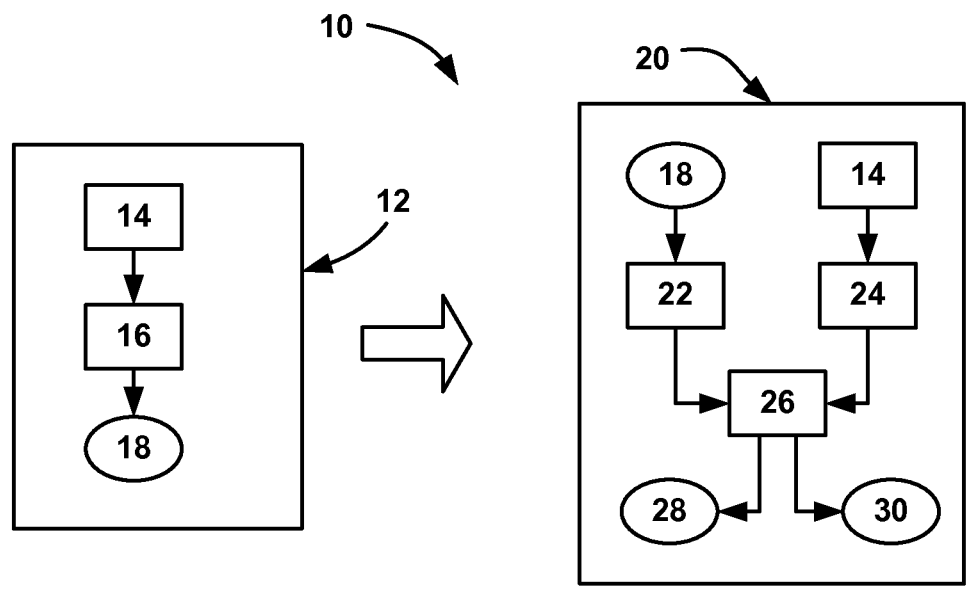
FIG. 1 is a schematic block diagram showing a process for certifying a digital signature.

FIG. 1 is a block diagram 10 of a known method for using asymmetric key digital signatures for authenticating files which are programmed into controllers. As would be understood by those skilled in the art, asymmetric key cryptography uses a pair of mathematically-related keys known as a private key and a public key to encrypt and decrypt a message. To create a digital signature, a signer uses his private key, which is known only to himself, to encrypt a digital message. The digital signature can later be decrypted by another party using the public key that is paired to the signer's private key to authenticate a file or message.

In a signing step 12, a content file 14 is provided, where the content file 14 could be a piece of software, a calibration file, or other "soft-part" content to be used in a controller. A hash calculation is performed on the content file 14 to produce a hash value 16 that encrypts the content file 14. The hash value 16 is then encrypted with the signer's private key to produce a digital signature 18, where the digital signature 18 is only good for that particular content file.

The digital signature 18 and the content file 14 are then used in a verifying step 20, which would be performed by the bootloader in the ECU in the application being discussed herein. The digital signature 18 is decrypted using the signer's public key to produce a decrypted hash value 22. Meanwhile, a hash calculation is performed on the content file 14 by the verifier, to produce a calculated hash value 24. At box 26, the decrypted hash value 22 is compared to the calculated hash value 24. If the decrypted hash value 22 matches the calculated hash value 24, then a valid determination is issued at oval 28, and the content file 14 is used. If the decrypted hash value 22 does not match the calculated hash value 24, then an invalid determination is issued at oval 30, and the content file 14 is not used.

Figure 2:
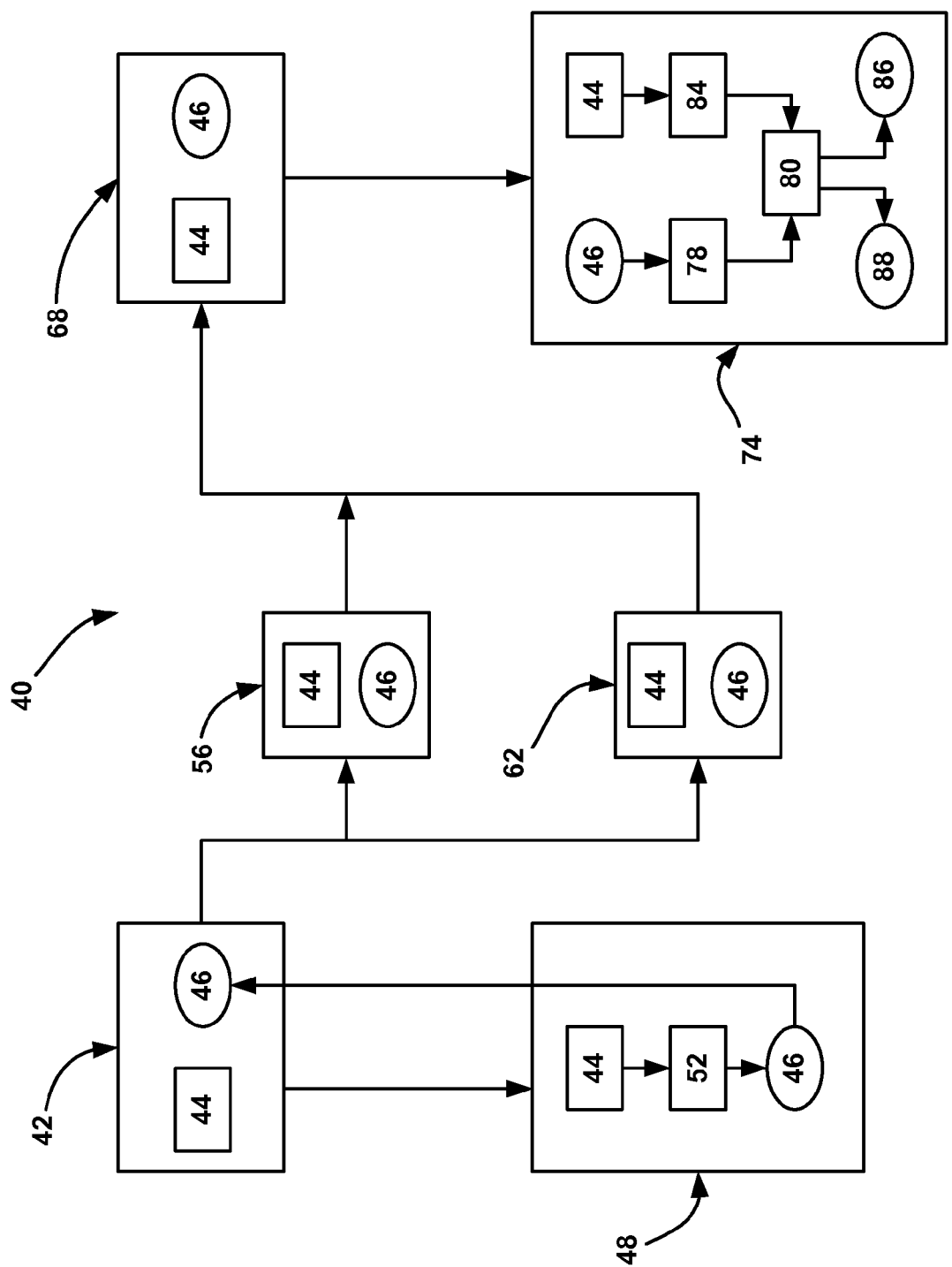
FIG. 2 is a block diagram of a method for signing and verifying electronic content using a digital signature including the delivery of content and signature files from programming source to executing controller.

FIG. 2 is a block diagram 40 showing a method for signing and verifying electronic content using a digital signature, including the delivery of content and signature files from a programming source to an executing controller. A file repository 42 stores a software executable, a calibration file or other "soft-part" file, collectively known as a content file 44. The content file 44 is typically a binary file. It is desired to obtain a digital signature 46 for the content file 44. In order for the content file 44 to be digitally signed, the content file 44 is provided to a signing server 48. On the signing server 48, a hash calculation is performed on the content file 44 to produce a hash value 52. The hash value 52 is encrypted using the private key stored on the signing server 48, where the encryption produces the digital signature 46. The digital signature 46 is then provided back to the repository 42.

At this point, the content file 44 and the digital signature 46 both exist in the repository 42. The challenge is then to deliver the content file 44 and the digital signature 46 through the various business systems used by the automotive manufacturer and install and validate the content file 44 on a controller in a vehicle. In general, an automotive manufacturer will have at least two organizations or departments responsible for installing software and calibration files on controllers in vehicles, namely, manufacturing and service. FIG. 2 shows a manufacturing database 56, used by the automotive manufacturer's manufacturing department for managing electronic files which are installed as "parts" in production vehicles. FIG. 2 likewise shows a service database 62, used by the auto manufacturer's service department for managing electronic files which are installed as "service parts" in vehicles that are worked on in a service facility. As shown in FIG. 2, the manufacturing database 56 and the service database 62 both receive copies of the content file 44 and the digital signature 46 to be used for the respective functions of the manufacturing and service departments.

In order to actually install the content file 44 on a controller in a vehicle, a programming tool 68 is used. As shown, the programming tool 68 also receives a copy of the content file 44 and the digital signature 46. That is, the manufacturing department could provide the content file 44 and the digital signature 46 from the manufacturing database 56 to the programming tool 68 for installation on a new production vehicle, or the service department could provide the content file 44 and the digital signature 46 from the service database 62 to the programming tool 68 for installation on a vehicle being serviced.

The next step is for the programming tool 68 to install the content file 44 on a controller in a vehicle. ECU 74 is the controller that will actually use the content file 44. Following is a brief discussion of the architecture of the ECU 74. The software on the ECU 74 consists of a bootloader, a software executable, and one or more calibration files. For the purposes of this discussion, the ECU 74 is assumed to have a single central processing unit (CPU). In actual vehicles, the ECU 74 could have multiple CPUs, and each CPU would have a bootloader, a software executable, and one or more calibration files.

The bootloader in the ECU 74 is responsible for validating and installing new software executables and calibration files. Thus, the functions described in this paragraph are performed by the bootloader in the ECU 74. The programming tool 68 provides the content file 44 and the digital signature 46 to the ECU 74. The digital signature 46 is decrypted by the bootloader using the public key of the repository 42 to produce a decrypted hash value 78. The public signing key may be resident in the ECU 74 or be provided to the ECU 74 in conjunction with the content file 44 and digital signature 46. Meanwhile, a hash calculation is performed on the content file 44 by the bootloader to produce a calculated hash value 84. At box 80, the decrypted hash value 78 is compared to the calculated hash value 84. If the decrypted hash value 78 matches the calculated hash value 84, then a valid determination 88 is issued, and the content file 44 is used. If the content file 44 to be used is a software executable, the bootloader installs it as the new software executable on the ECU 74. If the content file 44 to be used is a calibration file, the bootloader installs it as one of the one or more calibration files on the ECU 74. If the decrypted hash value 78 does not match the calculated hash value 84, then an invalid determination 86 is issued, and the content file 44 is not used on the ECU 74.

Figure 3:
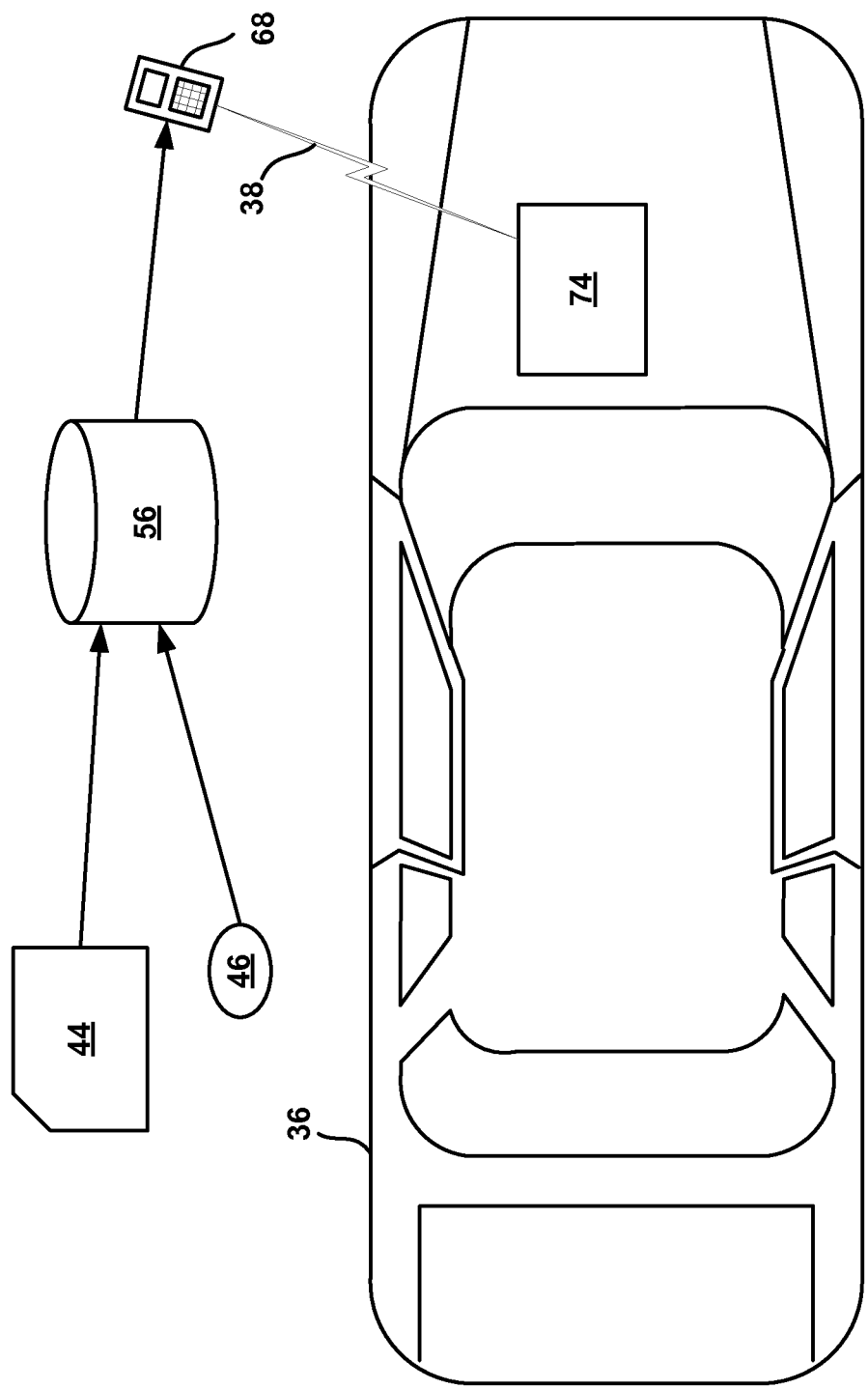
FIG. 3 is a schematic diagram showing how electronic content and a digital signature are physically delivered to a controller in a vehicle.

FIG. 3 is a schematic diagram showing how electronic content and digital signature files are physically delivered to a vehicle controller. A vehicle 36 includes the ECU 74 shown in FIG. 2 and discussed above. The ECU 74 could control the engine, transmission, chassis, body, infotainment, or other system on the vehicle 36. The content file 44 and the digital signature 46 are provided to a central database, shown here as the manufacturing database 56. The transfer of the content file 44 and the digital signature 46 to the manufacturing database 56 could take place over a company network. The manufacturing database 56 provides the content file 44 and the digital signature 46 to the programming tool 68, where this transfer could be accomplished by attaching the programming tool 68 to a computer which has access to the database 56. The programming tool 68 communicates with the ECU 74 via a connection 38, which may be wired or wireless. With the connection 38 established, the content file 44 and the digital signature 46 can be downloaded from the programming tool 68 to the ECU 74, where the bootloader can perform the security verification functions discussed previously.

The present invention proposes a technique for writing or flashing a new public key or replacement public key for a bootloader stored in the memory of a vehicle ECU to replace an existing public key if the currently stored public key has been compromised or otherwise needs to be replaced. As discussed above, secure flash programming requires a public key embedded in the bootloader. The present invention describes a cost effective and reliable technique to replace the public key in the bootloader. The method includes utilizing the ECU flash memory to store the keys, a data structure that supports flash write without an erase, and an algorithm to reliably replace the keys. The technique includes reserving a dedicated memory section in the ECU memory that is available to store multiple public keys, where the memory section is referred to as a key table, and where the key table is or can be within the same memory flash segment as the bootloader software or code. When the bootloader program is first written or flashed with software and/or calibration files, the key table is left empty, other than to store the original public key in the first key table memory slot. This allows the key table to subsequently be written to without erasing the flash memory segment in which the bootloader is stored. Each memory slot in the key table includes a valid key flag that when set indicates that the key in that memory slot is a valid key. The bootloader will use the last valid key in the key table.

If the bootloader public key needs to be replaced, the replacement key is written into the first empty row or memory slot in the key table and no other previously stored public keys are modified or erased. If there are no memory slots available in the key table to receive a replacement public key or the key replacement fails, the algorithm replies to the requester trying to write the new key with an appropriate response indicating the write failure. The bootloader will use the last valid key in the key table during the secure flash programming function to write to the ECU. A secure mechanism can be used to replace the key where the ECU specific routine can be signed using the ECU's current valid key, and instructions and routines can be made using similar strategies as secure flash programming.

Figure 4:
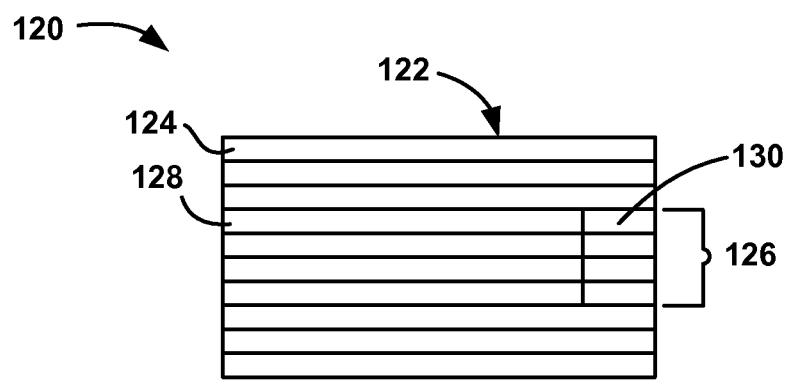
FIG. 4 is a representation of a portion of an ECU memory including key table memory segments for storing replacement public keys that is separate from the bootloader memory segment.

FIG. 4 is a representation of a portion of an ECU memory 120 that shows a memory segment 122 including memory slots 124 in which a bootloader is stored in the ECU 74. Several of the memory slots 124 in the memory segment 122, here four slots, are defined as a key table 126 and are dedicated for only storing public keys within the bootloader memory segment 122. The key table 126 can be located anywhere in the bootloader memory segment 122. The original public key will be stored in the first slot 128 in the key table 126 and the remaining slots in the key table 126 will be left open for subsequent replacement keys. The empty key slots default to an invalid key entry. The bootloader will be programmed to use the last valid key in the list of keys in the key table 126. Each memory slot in the key table 126 includes a validity flag 130 that identifies those keys that are currently valid, where the bootloader uses the last valid key in the key table 126 as the "current valid key." Those slots in the key table 126 that are empty are "flagged" invalid, by the default erased memory state, and thus would not be used. If a key flashing process is being performed and power is interrupted where the replacement key may have been written into the next available key table memory slot, that memory slot will still include an invalid flag set because the new key flashing process was not completed. Thus, the bootloader will not use that last written key, but will return to the previous valid key above it.

If the flashing process for writing the new key has been completed and that memory slot in the key table 126 is indicated as being valid, then the bootloader will use that key as the valid key even though memory slots above that key are also indicated as being valid. If a flashing process for a new key is interrupted, a previous valid key can still be used. The default erased state of the flash memory used to store the keys would have the effect that the key would be considered invalid. The first erased memory slot can also be used to quickly find the last valid key. Any integrity check of the bootloader memory segment 122 that executes during normal operation should exclude the key table entries unless the check-sum is updated to account for the newly written key data. If all the memory slots in the key table 126 are filled with keys, then the entire bootloader needs to be rewritten in order to replace the public key and again open up the key table 126.

Figure 5:
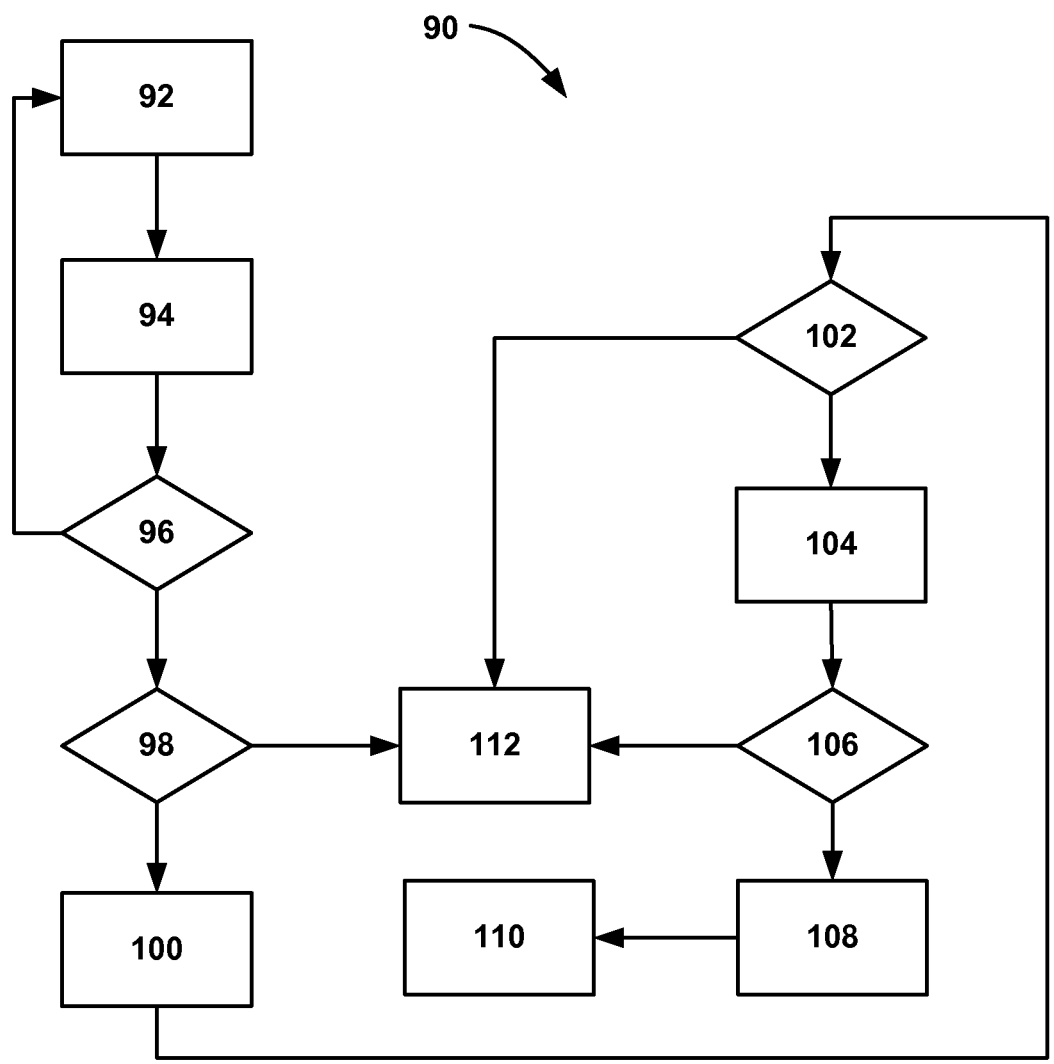
FIG. 5 is a flow chart diagram showing a method for replacing a bootloader public key in a memory of a vehicle ECU.

FIG. 5 is a flow chart diagram 90 showing a method for replacing a bootloader public key in the memory of a vehicle ECU as discussed above. A bootloader programming executive at box 92 controls the bootloader in the ECU memory, and may be a service or programming tool at a servicing facility. The bootloader programming executive may make contact with the bootloader at box 94 to perform some operation, such as transfer data, maintenance, reprogramming, reflashing, etc. The bootloader determines whether a public key update is requested at decision diamond 96, and if not, returns to the box 92 to await instructions from the bootloader programming executive for the next flash process. If a public key update is requested at the decision diamond 96, then the bootloader determines whether the request is valid at decision diamond 98, and if so, locates the first available memory slot in the key table at box 100 that is available to accept the replacement public key. Any suitable secure process can be used to determine if the request is valid. The bootloader then determines whether a memory slot is available to accept the replacement key at decision diamond 102, and if so, writes the replacement public key to that slot in the key table at box 104. The bootloader then determines whether the replacement public key has been written to the ECU memory at decision diamond 106, and if so, marks the new key as valid at box 108 and sends a positive response message to the requester at box 110. If the request is invalid at the decision diamond 98 or an available slot is not found in the key table at the decision diamond 102 or the replacement key write has not properly occurred at the decision diamond 106, then the bootloader sends a negative response message to the requester at box 112.

Figure 6:
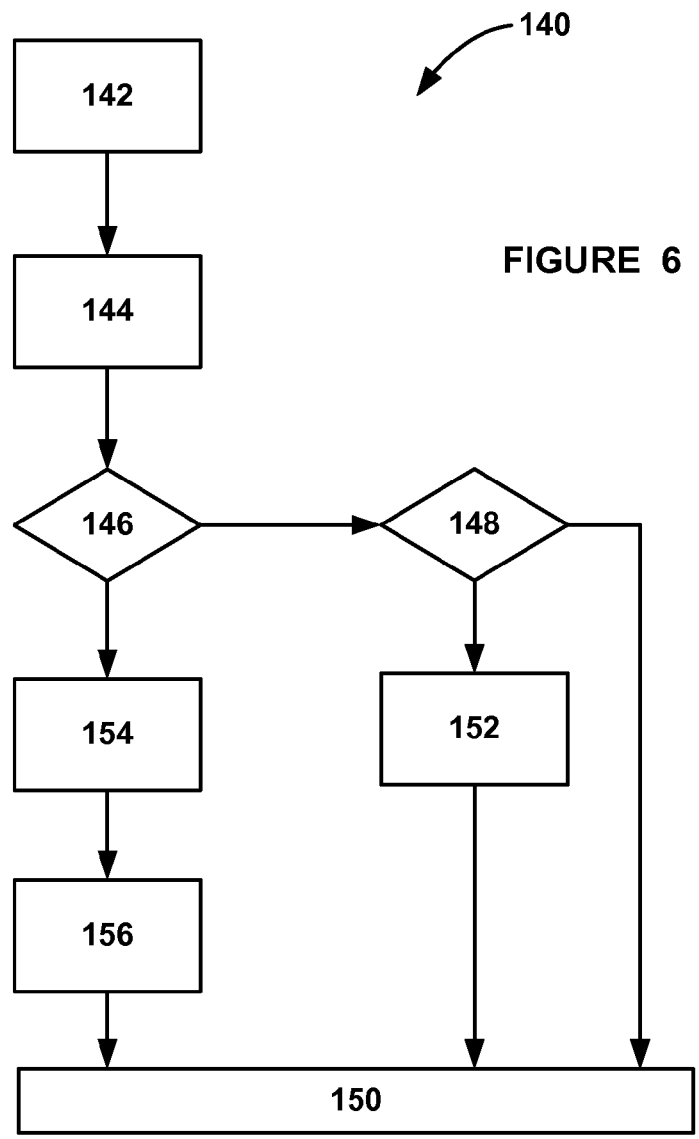
FIG. 6 is a flow chart diagram showing an operation to replace the key with a built-in recovery system.

FIG. 6 is a flow chart diagram 140 showing a process to replace the public key with a built-in recovery system. The algorithm initiates at box 142 to start the process for replacing the key. At box 144, the algorithm sets a key index to the last memory slot in the key table 126 that is not empty to determine if that memory slot has a valid key. At decision diamond 146, the algorithm determines whether the new replacement key to be written into the key table is the same as the key that is in the last full memory slot in the key table 126 to determine whether the last key written was a valid write. If the new key is the same as the key in the last slot at the decision diamond 146, then the algorithm determines whether the validity flag 130 for that key has been set to valid at decision diamond 148. If the validity key flag 130 has been set to valid and the new key is the same as the key being attempted to be flashed, then the process ends at 150. If the validity flag has not been set to valid at the decision diamond 148, then the algorithm sets the validity flag to valid at box 152 and the process ends at the box 150. If the new key being flashed is not the same as the key in the last full slot of the key table 126 at the decision diamond 146, then the algorithm writes the new key to the next open slot in the key table 126 at box 154 and sets the valid flag for the new slot valid at box 156.

Figure 7:
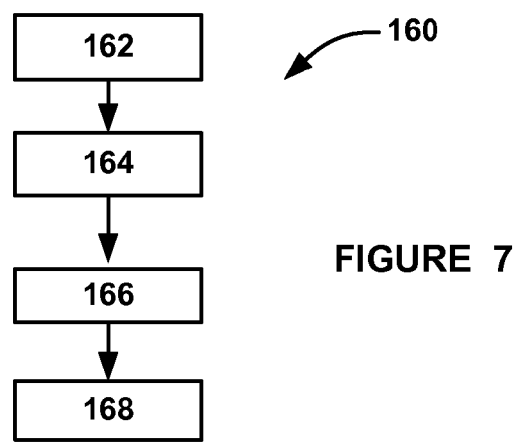
FIG. 7 is flow chart diagram showing a process for reading the key.

FIG. 7 is a flow chart diagram 160 showing a process for reading the key during normal flashing operation. The algorithm initiates a read key sequence at box 162 and then identifies the last slot in the key table 126 that includes a valid flag at box 164. The algorithm reads the key value in that slot at box 166 and the process ends at box 168.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for replacing a public key in a bootloader stored in a controller, said method comprising:
    defining a bootloader memory segment in a memory in the controller that the bootloader will be stored in;
    defining a key table in the bootloader memory segment that includes a plurality of available memory slots for storing public keys;
    storing an original public key in a first memory slot in the key table and leaving the rest of the memory slots in the key table empty, wherein storing the original public key in a first memory slot includes setting a validity flag to valid in the first memory slot, and setting all of the other memory slots in the key table to invalid;
    receiving a public key update request; and
    storing a replacement public key in a next memory slot below a last stored public key in the key table, wherein the replacement public key is used without rewriting the bootloader, and wherein the previously stored original public key is not modified or erased.

2. The method according to claim 1 further comprising determining whether a request to store a replacement key is valid before storing the replacement key.

3. The method according to claim 1 wherein storing the replacement public key in a next memory slot includes setting the validity flag for the next memory slot to valid if it is determined that the replacement public key has been written completely.

4. The method according to claim 1 wherein storing a replacement public key includes determining whether the replacement public key is the same as a public key stored in the last memory slot in the key table that includes a public key and determining whether the validity flag for that memory slot is set to valid.

5. The method according to claim 4 further comprising setting the validity flag to valid if the replacement public key is the same as the public key already in the last memory slot and if the valid flag had been set to invalid.

6. The method according to claim 1 further comprising erasing the entire key table if all of the memory slots in the key table are full and it is necessary to replace the public key.

7. The method according to claim 1 wherein the public key is used in an asymmetric key cryptography process for securely flashing programs into the controller that includes a process for hashing a content file to be stored in the controller and verifying a digital signature of the hash of the content file using the public key.

8. The method according to claim 1 wherein the controller is an electronic control unit (ECU) on a vehicle.

9. A method for replacing a public key in a bootloader stored in a memory of an electronic control unit (ECU) on a vehicle, said method comprising:
    defining a bootloader memory segment in a memory in the ECU that the bootloader will be stored in;
    defining a key table in the bootloader memory segment that includes a plurality of available memory slots for storing public keys;
    storing an original public key in a first memory slot in the key table and leaving the rest of the memory slots in the key table empty;
    setting a validity flag associated with the first memory slot in the key table to valid and setting all other validity flags associated with the empty slots to invalid;
    storing a replacement public key in a next memory slot below the last stored public key in the key table;
    receiving a public key update request; and
    setting the validity flag for the next memory slot to valid once the replacement public key is stored, wherein the replacement key is used without rewriting the bootloader, and wherein the previously stored original public key is not modified or erased.

10. The method according to claim 9 wherein storing a replacement public key includes determining whether the replacement public key is the same as a public key stored in the last memory slot in the key table that includes a public key and determining whether the validity flag for that memory slot is set to valid.

11. The method according to claim 9 further comprising setting the validity flag to valid if the replacement public key is the same as the public key already in the last memory slot and if the validity flag had been set to invalid.

12. The method according to claim 9 further comprising erasing the entire key table if all of the memory slots in the key table are full and it is necessary to replace the public key.

13. The method according to claim 9 wherein the public key is used in an asymmetric key cryptography process for securely flashing programs into the controller that includes a process for hashing a content file to be stored in the controller and verifying a digital signature of the hash of the content file using the public key.

14. A system for replacing a public key in a bootloader stored in a controller, said system comprising:
    means for defining a bootloader memory segment in a memory in the controller that the bootloader will be stored in;
    means for defining a key table in the bootloader memory segment that includes a plurality of available memory slots for storing public keys;
    means for storing an original public key in a first memory slot in the key table and leaving the rest of the memory slots in the key table empty;
    means for receiving a public key update request; and
    means for storing an replacement public key in a next memory slot below a last stored public key in the key table, wherein the replacement public key is used without rewriting the bootloader, and wherein the previously stored original public key is not modified or erased, and wherein a validity flag for the next memory slot is set to valid.

15. The system according to claim 14 wherein the means for storing the original public key in a first memory slot sets a validity flag to valid in the first memory slot, and sets all of the other memory slots in the key table to invalid.

16. The system according to claim 14 wherein the means for storing a replacement public key determines whether the replacement public key is the same as a public key stored in the last memory slot in the key table that includes a public key and determines whether the validity flag for that memory slot is set to valid.

17. The system according to claim 16 further comprising setting the validity flag to valid if the replacement public key is the same as the public key already in the last memory slot and if the validity flag had been set to invalid.

18. The system according to claim 14 wherein the public key is used in an asymmetric key cryptography process for securely flashing programs into the controller that includes a process for hashing a content file to be stored in the controller and verifies a digital signature of the hash of the content file using the public key.

* * * * *